United States Patent [19]
De Gotari

[11] Patent Number: 6,084,571
[45] Date of Patent: Jul. 4, 2000

[54] SUBSTANTIALLY STATIONARY PRESSURE SENSITIVE SYSTEM FOR PROVIDING INPUT TO AN ELECTRICAL DEVICE, PARTICULARLY A COMPUTER

[76] Inventor: Sergio Salinas De Gotari, Cuesta N° 8 Colonia, Jardines Del Pedregal CP, 01900, Mexico

[21] Appl. No.: 09/104,323

[22] Filed: Jun. 25, 1998

Related U.S. Application Data

[62] Division of application No. 08/833,307, Apr. 4, 1997.

[51] Int. Cl.[7] ............................. G09G 5/00; G09G 5/08
[52] U.S. Cl. ........................................ 345/157; 345/156
[58] Field of Search .................... 345/156, 157, 345/158, 160, 162, 163, 166

[56] References Cited

U.S. PATENT DOCUMENTS

| | | | |
|---|---|---|---|
| 4,315,695 | 2/1982 | Alves dos Santos et al. | 401/99 |
| 4,543,571 | 9/1985 | Bilbrey et al. | 345/166 |
| 4,712,100 | 12/1987 | Tsumekumi et al. | 345/166 |
| 5,006,836 | 4/1991 | Cooper | 345/163 |
| 5,065,146 | 11/1991 | Garrett | 345/161 |
| 5,473,344 | 12/1995 | Bacon et al. | 345/157 |
| 5,517,211 | 5/1996 | Kwang-chien | 345/166 |
| 5,541,623 | 7/1996 | Engstrom | 345/166 |
| 5,563,629 | 10/1996 | Caprara | 345/160 |
| 5,724,068 | 3/1998 | Sanchez et al. | 345/161 |
| 5,748,180 | 5/1998 | Inukai | 345/158 |
| 5,790,108 | 8/1998 | Salcudean et al. | 345/157 |

*Primary Examiner*—Vijay Shankar
*Attorney, Agent, or Firm*—Vinson & Elkins L.L.P.

[57] ABSTRACT

A substantially stationary sensor for providing an input signal to an electrical device based on the mechanical force applied to a sensor includes first and second laminar springs. The deflection of the laminar springs caused by the force placed on the sensor is measured by opto-electronic systems associated with each laminar spring. The output of the opto-electrical systems on each of two orthogonal axes is an electrical signal which is transformed into a signal usable by the electrical device. One specific application of the system is for a mouse used to control the position of a cursor on a computer screen.

40 Claims, 5 Drawing Sheets

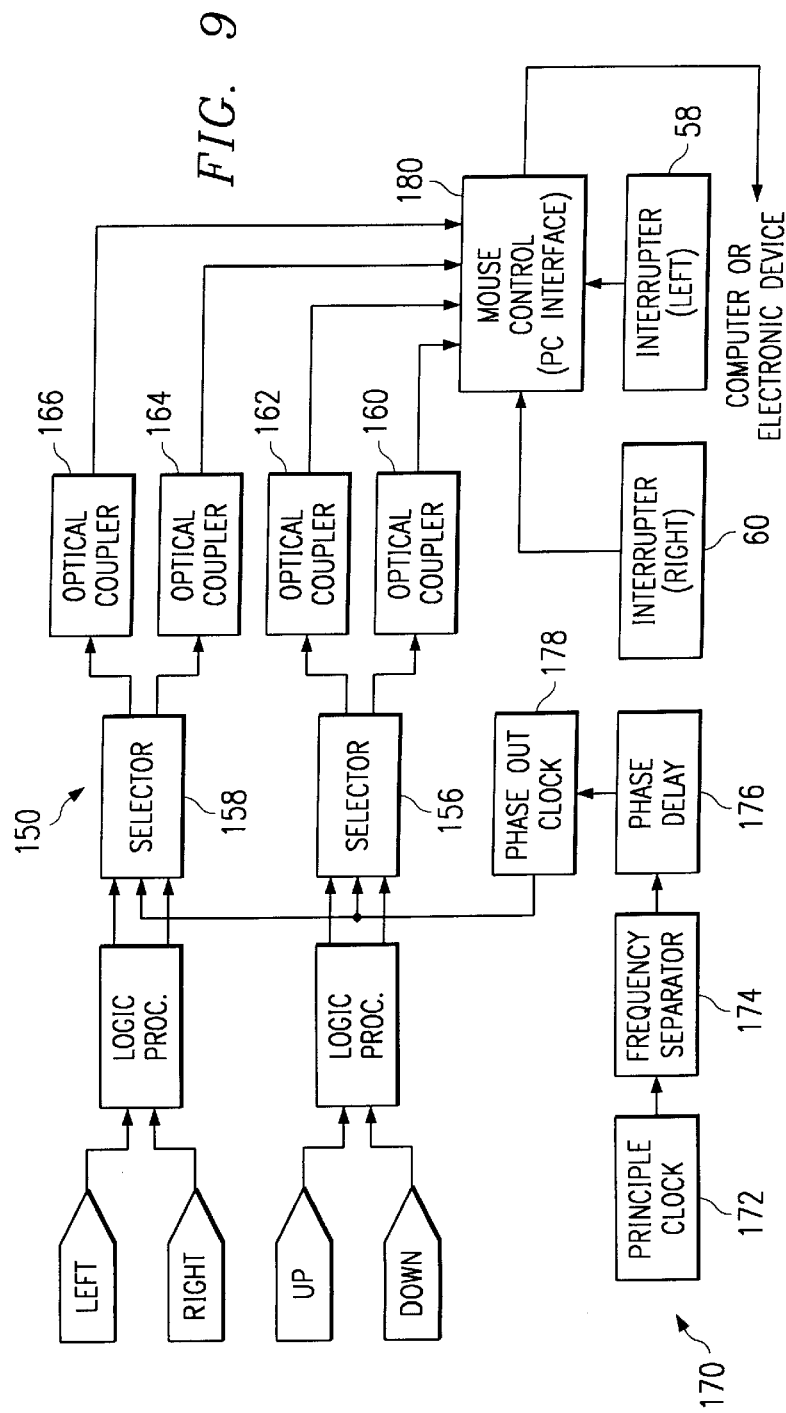

6,084,571

SUBSTANTIALLY STATIONARY PRESSURE SENSITIVE SYSTEM FOR PROVIDING INPUT TO AN ELECTRICAL DEVICE, PARTICULARLY A COMPUTER

This application is a division of application Ser. No. 08/833,307 filed Apr. 4, 1997.

FIELD OF THE INVENTION

The present invention pertains to pressure sensitive mechanical sensor systems which provide an input to electrical devices; more particularly, the present invention pertains to substantially stationary pressure sensitive mechanical sensor systems which may be used to position the cursor on a computer screen.

BACKGROUND

While the present invention will be described in terms of a computer mouse, those of ordinary skill in the art will understand that the principles embodied in the present invention are applicable to a wide range of pressure sensitive mechanical sensor systems that are frequently used for providing input to one or more electrical devices.

Most computer users have become quite familiar with the use of a hand-operated moveable computer mouse for controlling the position of the cursor on a computer screen. Such devices move on a roller ball. When the cursor is in its desired location the user typically depresses a left or right control button to activate a program or provide operating instructions to the computer.

While many use a hand-operated moveable computer mouse to operate personal computers, a hand-operated moveable computer mouse is not suitable for all computer users. For example, when the space in which to move a computer mouse is limited, there is a need for a computer mouse which can provide an input to a computer based solely on the force applied to the computer mouse. Such pressure sensitive computer input devices would be particularly suitable for computer users who may be suffering from Carpal Tunnel Syndrome in their hands but are able to use their feet to position a cursor on a computer screen. In May 1996, Scientific American Magazine reported that some manufacturers were adapting hand-operated, roller ball type computer mouse input devices for engagement by the computer user's foot.

Pressure sensitive computer input sensor systems would also be particularly beneficial for handicapped or elderly computer users who may not have the facility to make accurate movements of a computer mouse on a roller ball yet could exert the necessary force on a pressure sensitive device to position a cursor on a computer screen and activate a left or right pressure sensitive control switch.

There is, therefore, a need in the art for a substantially stationary pressure sensitive mechanical sensor system which can be used to move and position a cursor on a computer screen and provide left and right pressure sensitive control switches or mouse control buttons.

SUMMARY

The present invention provides a substantially stationary pressure sensitive mechanical sensor system can be used to provide an input to a computer for controlling the position of a cursor on a computer screen. More generally, the present invention describes a substantially stationary electromechanical sensor system which can be used to provide a signal to an electrical device based on the force applied to the sensor.

The substantially stationary pressure sensitive computer input mechanical sensor system of the present invention includes a laminar spring block assembly having a first and a second laminar spring. The first and second laminar springs are oriented along axes which are perpendicular to each other. When force is applied to the substantially stationary pressure sensitive computer input mechanical sensor system of the present invention, one or both of the two laminar springs deflect slightly. Because the two laminar springs also provide a reflective surface, the small deflection of the laminar springs can be measured with an opto-electronic system which measures the changes in the reflection of a beam of light when the reflective surface of the laminar spring is moved. Specifically, the output of the opto-electronic system is an electrical signal which is representative of the deflection of each of the two laminar springs.

The two opto-electronic systems associated with each of the first and second laminar springs sense the change in the reflection of a beam of light which is first emitted by an LED. The reflection of the beam of light off the surface of each of the two laminar springs is measured by a light receptor or a photo-transistor. The electrical signal output from the light receptor is representative of the distance that the reflected light beam travels from the surface of each of the two laminar springs to the light receptor. Because of the angular relationship between the LED and the light receptor any small deflection of the laminar spring will change the amount of light reflected by the laminar spring and subsequently received by the light receptor. The change in the amount of light received by the light receptor changes the electrical signal produced by the light receptor. Thus, the electrical signal output of the light receptor can be directly correlated to the deflection of each of the two laminar springs which in turn can be correlated to the orthogonal force components placed on each of the two laminar springs.

The electrical signal output of the light receptors associated with both of the axes on which the two laminar springs are located is compared to a reference signal using a comparison circuit. The output of this comparison circuit is indicative of the result of the comparison of the electrical signal output of the two light receptors to the reference signal. The output of the comparison circuit is then conveyed to a second circuit which transforms the output of the comparison circuit into a digital signal. This digital signal contains information which indicates whether the force on the sensor is up, down, left, or right.

The digital signal output of the second circuit is subsequently conveyed to a third circuit. The third circuit transforms the digital signal from the second circuit into a signal usable by the computer or by the electrical device. In the preferred embodiment of the invention the directional information from the digital circuit is conveyed to the third circuit on clock pulses which are 90° out of phase with each other.

BRIEF DESCRIPTION OF THE FIGURES

A better understanding of the substantially stationary pressure sensitive mechanical sensor system for providing an input signal to a computer for controlling the position of a cursor on a computer screen may be had by reference to the figures wherein:

FIG. 8 is the truth table used to produce four directional signals indicative of the direction of force application;

FIG. 9 is a second block diagram illustrating the processing of the four directional signals.

DESCRIPTION OF THE EMBODIMENTS

While the present invention may be used to provide position signal input information to a variety of electrical equipment the present invention will be explained particularly with regard to its utilization to provide movement of a cursor on a computer screen. Specifically, the pressure sensitive mechanical sensor system of the present invention will be explained with regard to its utilization to provide the type of cursor movement on a computer screen now most frequently provided by a hand-operated computer mouse which moves on a rollerball.

Figure 1:
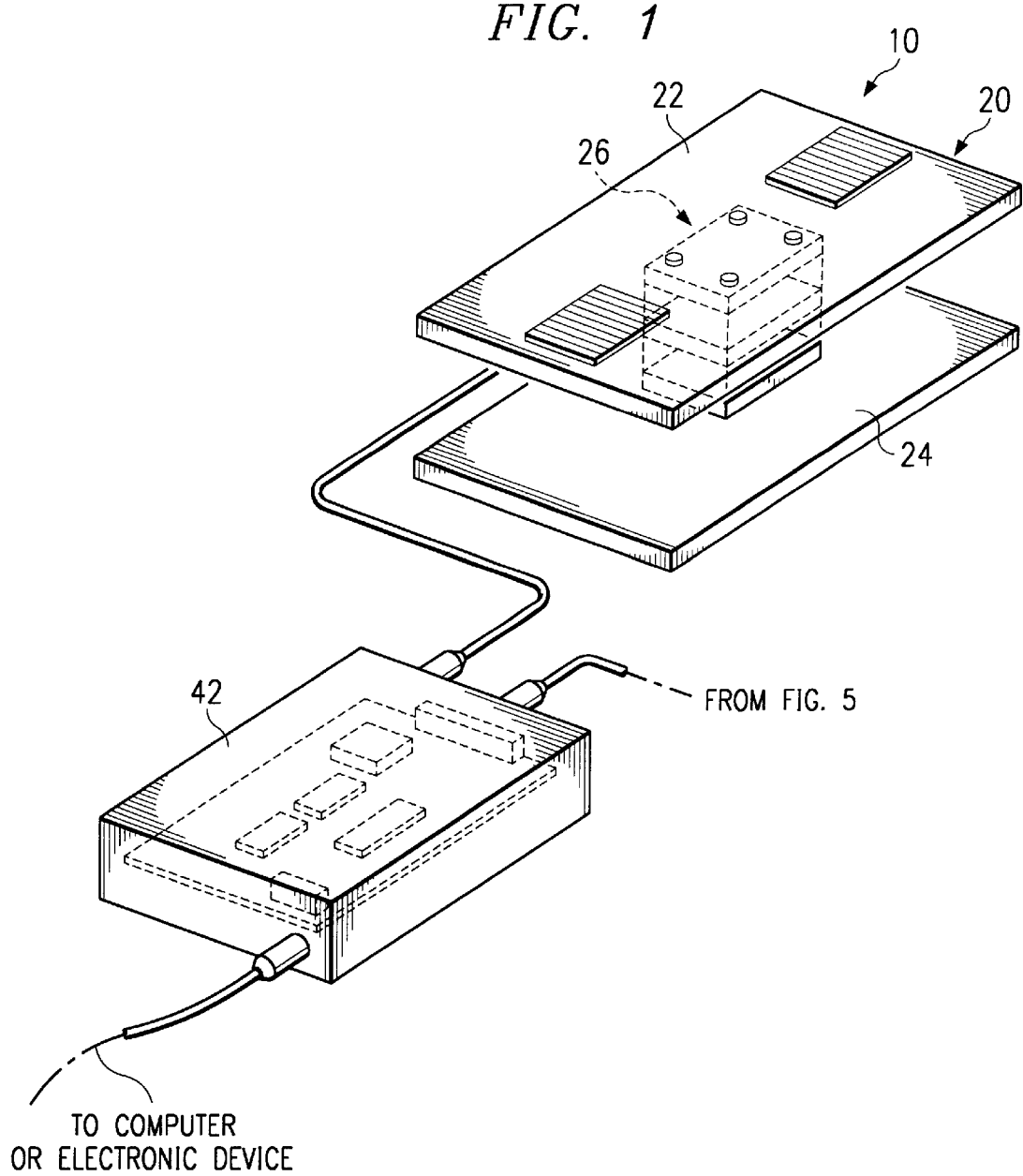
FIG. 1 is a perspective view of the cursor movement assembly portion of the substantially stationary pressure sensitive mechanical sensor system of the present invention.
Figure 2:
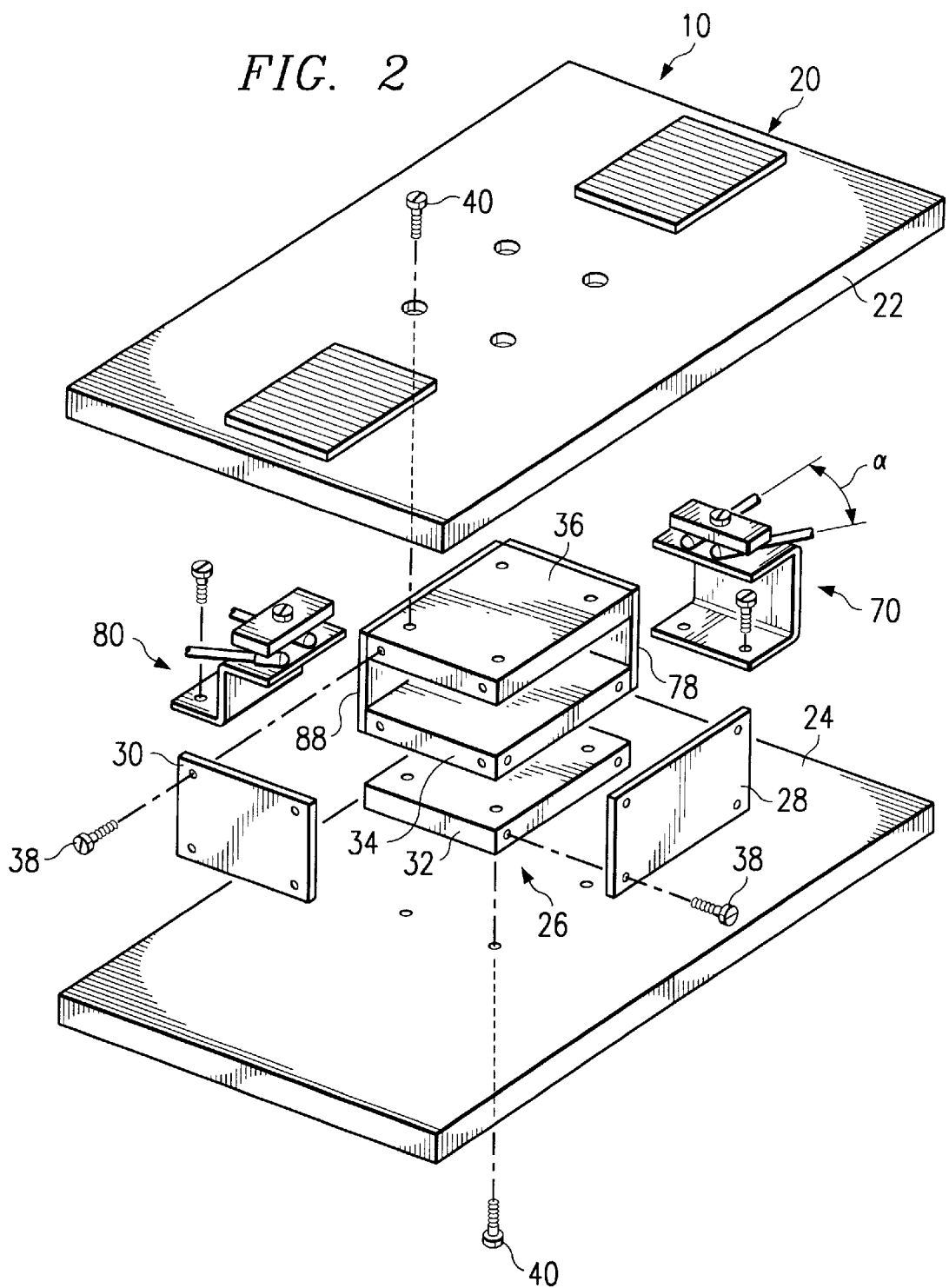
FIG. 2 is an exploded view of the cursor movement assembly portion of the device shown in FIG. 1.
Figure 5:
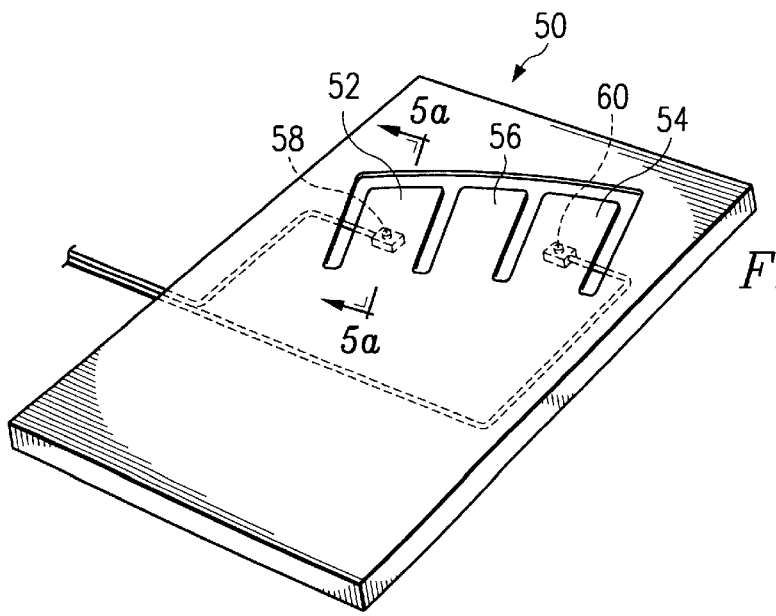
FIG. 5 is an enlarged perspective view of the left and right pressure sensitive control switch assembly.
Figure 5A:
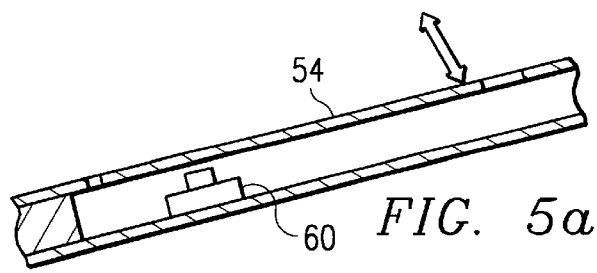
FIG. 5a is a right side elevational view, in partial section, of the control switch assembly shown in FIG. 5.

A better understanding of the construction of the pressure sensitive mechanical sensor system 10 of the present invention may be had by reference to FIGS. 1 and 2. Therein it may be seen that the pressure sensitive mechanical sensor system 10 of the present invention includes three parts. The first part is the cursor movement assembly portion 20. The second portion is the electronics package 42 and the third portion is the pressure sensitive switch assembly 50. The pressure sensitive switch assembly 50 which connects to the electronics package 42 is shown in FIG. 5.

The cursor movement assembly 20 includes four elements. The first element is a support plate 24. The support plate 24 may be placed on a substantially level surface, such as a floor. The support plate 24 provides a mounting for the second element, the laminar spring block assembly 26. The laminar spring block assembly 26 in turn connects to the third element, the force receiving plate 22. Mounted alongside the laminar spring block assembly 26 between the support plate 24 and the force receiving plate 22 is the fourth element, the two opto-electronic systems 70, 80.

In the preferred embodiment, the user's foot is placed on the force receiving plate 22. When the user applies force to the force receiving plate 22 the laminar spring block assembly 26 which connects the support plate 24 and the force receiving plate 22 experiences a slight deflection. The amount of this deflection is dependent on the rigidity of the laminar spring block assembly 26.

Figure 3:
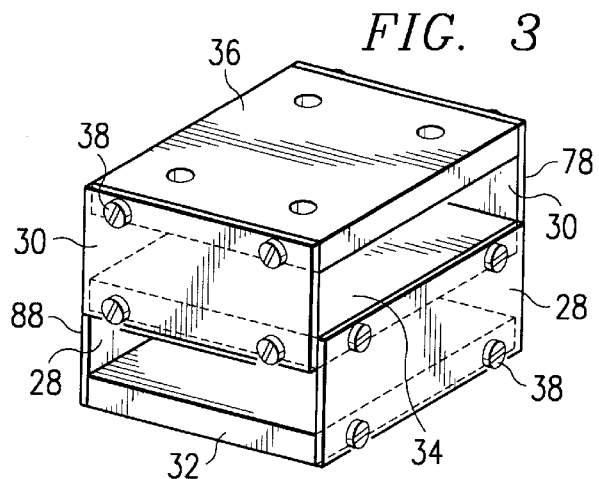
FIG. 3 is a perspective view of the laminar spring block assembly used to connect the top and bottom support plates of the cursor movement portion of the device.

As shown in FIG. 2 the mechanical interconnection between the support plate 24 and the force receiving plate 22 is by threaded fasteners 40 which engage the laminar spring block assembly 26. As shown in FIG. 3, the laminar spring block assembly 26 consists of two sets of two parallel laminar springs 28, 30. Each of the two sets of two parallel laminar springs 28, 30 is oriented substantially perpendicular to the other set. Because the laminar springs are oriented along axes perpendicular to each other, typically called x and y axes, the deflection of a laminar spring oriented along the x and y axes represents the components of the applied force along the x and y axes respectively.

As may be seen in FIGS. 2 and 3, the bottom of the first pair of laminar springs 28 is connected to the bottom spacer plate 32 by four screw fasteners 38. The top of the first pair of laminar springs 28 is connected to the middle spacer plate 34. Also connected to the middle spacer plate 34 is the bottom of the second pair of laminar springs 30. The top of the second pair of laminar springs 30 is also connected to the top spacer plate 36 by screw fasteners 38.

When force is applied to the force receiving plate 22, the laminar spring pairs 28, 30 deflect in a manner predicted by the Chetwynd equation. Specifically, if: x=deflection in the extreme; the Chetwynd equation predicts that $x=4\ Fl^3/Ebh$, where:

F=force applied to a laminar spring expressed in terms of Newtons;
l=the length of the spring in meters;
E=the modulus of elasticity of the material from which the laminar spring is made;
b=the width of the laminar spring in meters; and
h=the thickness of the laminar spring in meters.

Thus, the sensitivity of the laminar block assembly 26 is dependent on the size of the individual laminar springs 28, 30. The deflection of one of the laminar springs in each laminar spring pair 28, 30 along each axis is sensed by the first and second opto-electronic systems 70, 80 which are placed in close proximity to the surface 78, 88 of the laminar springs. As the laminar springs deflect in response to the applied force, the distance between the surface of the laminar spring and the light receptor portions 76, 86 (FIG. 4) of the opto-electronic systems 70, 80 either increases or decreases.

Figure 4:
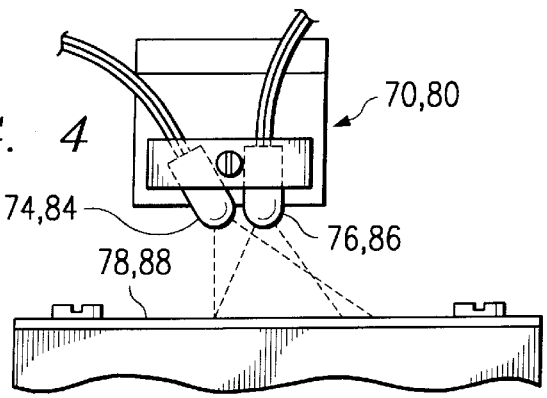
FIG. 4 is a plan view of the position of the LED and light receptor or photo transistor.

The positional relationship between the surface 78, 88 of the laminar spring and the light receptor 76, 86 may be seen with regard to FIG. 4. Therein it may been seen that the light receptor 76, 86 is placed substantially orthogonally to the surface of the laminar spring. The light emitting diode 74, 84 or other light emitting source is placed at an angle of substantially 30° to the receptor by the holder 72, 82. The purpose of this angular offset is explained below.

The amount of emitted light which is reflected off the surface 78, 88 of the laminar spring and received by the light receptor 76, 86 is affected by the distance from the surface 78, 88 of the laminar spring to the light receptor 76, 86. Specifically, if the distance between the reflective surface 78, 88 of the laminar spring and the light receptor 76, 86 is increased, the light receptor 76, 86 senses a different intensity of light than if the distance between the reflective surface 78, 88 of the laminar spring and the light receptor 76, 86 is decreased. This difference in the amount of light received by the light receptor 76, 86 is represented by different electrical signals produced at the output of the light receptor 76, 86. These electrical signals are transformed into signals which may be used by a computer by using the electronic circuitry explained below which may be contained in a box 42.

While an opto-electronic system is utilized with laminar springs in the present invention, it will be understood by those of ordinary skill in the art that other types of springs or resilient devices may be used without departing from the scope of the present invention.

As may be seen in FIG. 5 the sensor system of the present invention may also include a pressure sensitive switch assembly 50 which includes switches 58, 60 which are similar to the left and right buttons normally found on a hand-operated computer mouse. In the instant invention these pressure sensitive switches 58, 60 are operated by the foot of the user. Thus, when it is desired to "click" the left button of the mouse or to "click" the right button of the mouse the user merely repositions his foot to the proper position and presses either a left or right pedal 52, 54 which activates one of the pressure sensitive switches 58, 60. In the illustrated embodiment a middle pedal 56 is shown which can provide a central rest location for the foot of the user. The angle of the pressure sensitive switch assembly may be set by a support brace (not shown).

Figure 7:
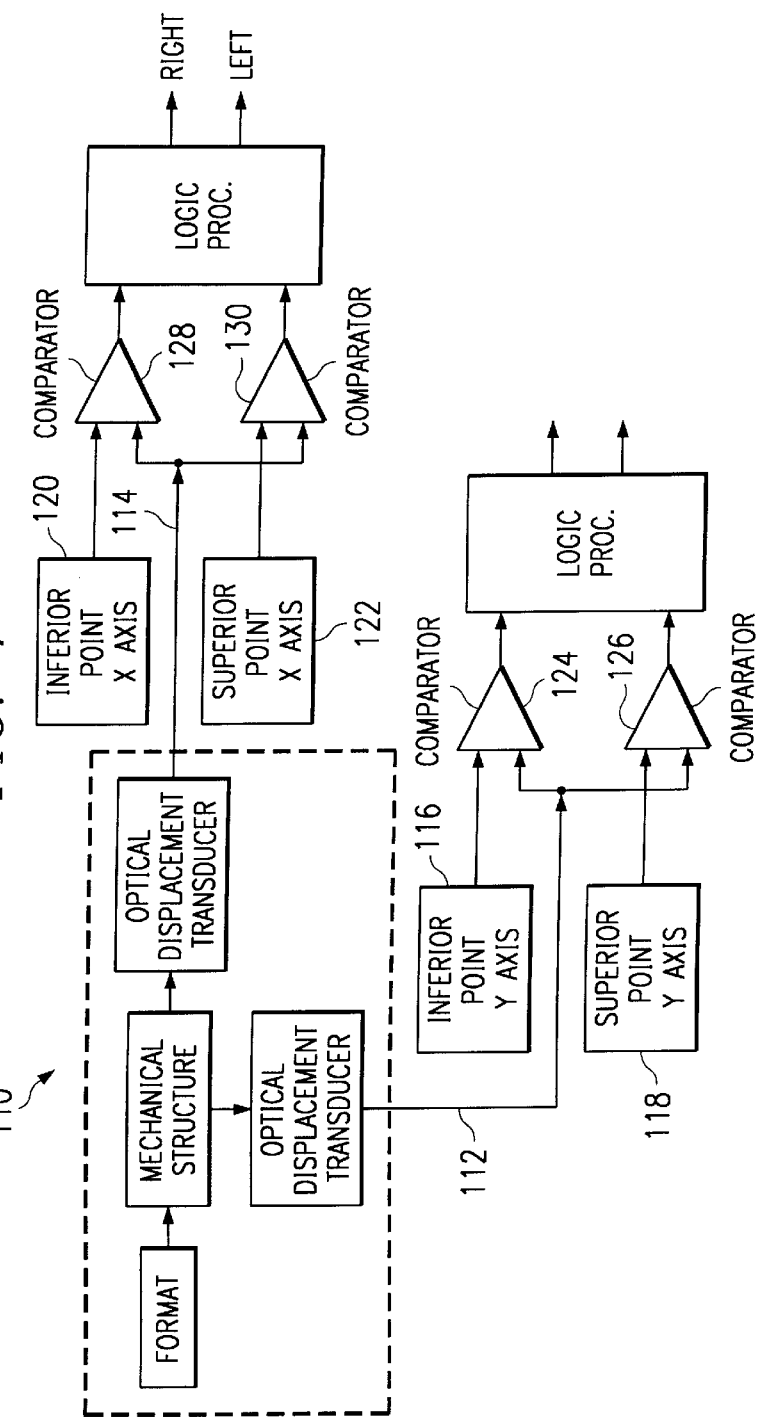
FIG. 7 is a first block diagram illustrating the processing of the signals received from the light receptors or photo transistors.

Returning now to the electrical output of the light receptors 76, 86, the output signal 112, 114 from each of the two light receptors 76, 86 is processed initially according to the flow diagram 110 shown in FIG. 7. First, the output of the light receptor 76, 86 is compared to a reference signal 116, 118. The comparison to the reference signal 116, 118 determines whether the directional force on the first laminar spring is in either an up or a down direction and the comparison to the reference signal 120, 122 determines whether the force on the second laminar spring is in either a left or a right direction.

As shown in FIG. 7 the output from the receptors 86 is passed through the comparison circuits 128, 130 to compare the preset values 120, 122 representing the inferior point on the left part of the x axis and the rightmost point on the x axis. This determines the position of the cursor on the x axis. Similarly the output 112 of the receptor 76 on the y axis is passed through comparison circuits 124, 126 to compare preset values 116, 118 to the inferior and superior points on the y axis to determine the position of the cursor on the y axis.

Figure 6:
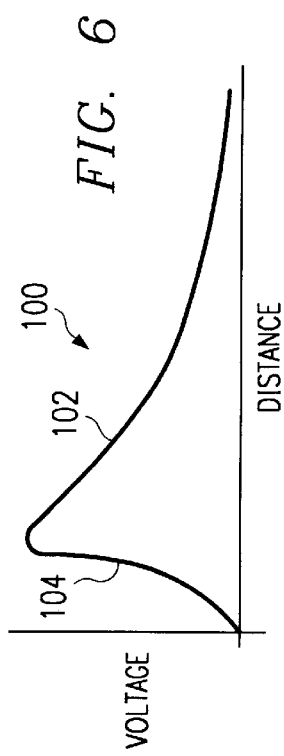
FIG. 6 is the response curve used to select a voltage which is indicative of the amount of reflected light received by the light receptor or photo transistor.

The comparison circuits use the output from the voltage-distance response relationship 100 shown in FIG. 6. The output from the light receptors 76, 86 is compared to the set points for each axis. As an example, using the truth table 106 shown in FIG. 8, when there is no movement at all, the output voltage is 1.0 volt. When there is a force on the force receiving plate 22 away from the body of the user or to the right of the body of the user, the voltage increases to 2.0 volts. When the force on the force receiving plate 22 is toward the body of the user or to the left, the voltage drops to 0.5 volts. Thus, the truth table 106 shown in FIG. 8 works together with the voltage distance response relationship 100 shown in FIG. 6 to indicate cursor displacement. It is the setting of the angle between the light emitter 74, 84 and the light receptor 76, 86 which determines the voltage associated with a rest position and whether the voltage displacement characteristic is on the front slope 104 or the back slope 102 of the voltage distance relationship 100 shown in FIG. 6. In the preferred embodiment the device is set to work on the back slope 102. That is, when the distance between the reflective surface 78, 88 of the laminar spring and the light receptor 76, 86 increases, there is less voltage. Similarly, when the distance between the reflective surface 78, 88 of the laminar spring and the light receptor 76, 86 decreases, there is a greater voltage.

The output from the block diagram 110 as depicted in FIG. 7 continues into the block diagram 150 as depicted in FIG. 9. Therein it will be seen that transmission of the left and right and up and down signals to the mouse control circuit 180 signals through the first and second selectors 156, 158 is triggered by a clock signal system 170. This clock signal system 170 includes a principal clock 172, a frequency separator 174, a phase delay 176 and a phase out clock 178. Such systems are well known by those of ordinary skill in the art. A multiplexor determines which clock pulse goes first. The clock pulse triggers the transmission of the signals to the mouse control circuit 180. The signals are transmitted 90° out of phase with each other through four opto-couplers 160, 162, 164, 166. Signals generally associated with the clicking of mouse buttons come directly to the mouse control circuit from the left and right pressure control switches shown in FIG. 5.

For the output signals 112, 114 from the light receptors 76, 86 to be usable they must be converted by first and second digital logic circuits 152, 154 into a digital signal. This digital signal is then converted into a signal which is usable by the electrical device requiring such signal. In a computer cursor control system the digital signal is typically conveyed to mouse control circuit. The mouse control circuit provides specific instructions for the computer to position the cursor on the computer screen. When the cursor is in proper position on the computer screen, additional signals from the left 58 or the right 60 cursor sensitive control switches may be received.

It will now be understood by those of ordinary skill in the art that the sensor for providing an electrical signal based on the force imparted to the sensor has been disclosed by reference to the preferred embodiment. Other embodiments of the instant invention based on the foregoing disclosure will be understood by those of ordinary skill in the art.

What is claimed is:

1. A substantially stationary computer screen cursor control system comprising:

a first laminar spring that deflects in response to a force applied in an x direction;

a second laminar spring that deflects in response to a force applied in an y direction;

a first opto-electronic system having a light emitting diode and a light receptor for generating a cursor position signal with respect to said deflection of said first laminar spring in said x-direction;

a second opto-electronic system having a light emitting diode and a light receptor for generating a cursor position signal with respect to said deflection of said second laminar spring in said y-direction, wherein the light emitting diodes of the first and second opto-electronic sensor systems are constructed and arranged to cause the light emitted by the light emitting diode to be reflected by the laminar springs into said light receptors so that the light receptors generate output representative of the received light; and circuit means for converting the output of both of said first and second opto-electronic systems into electrical signals usable by the computer to display the position of the cursor on the computer screen.

2. The substantially stationary computer screen cursor control system as defined in claim 1 wherein:

said light receptor is positioned substantially orthogonally to said laminar springs.

3. The substantially stationary computer screen cursor control system as defined in claim 2 wherein:

the electrical output of said means for receiving light is established by the angular position of said light emitting diode with respect to said light receptor.

4. The substantially stationary computer screen cursor control system as defined in claim 3 wherein:

said circuit means for converting the output of said first and second opto-electronic systems into an electrical signal further includes a comparison circuit.

5. The substantially stationary computer screen cursor control system as defined in claim 4 wherein:
said comparison circuit generates an electrical signal determined by the distance between one of said light receptors and one of said laminar springs.

6. The substantially stationary computer screen cursor control system as defined in claim 5 wherein:
said circuit means for converting the output of said first and second opto-electronic systems into electrical signals further includes a circuit for transforming the output of said comparison circuit into a digital signal.

7. The substantially stationary computer screen cursor control system as defined in claim 6 wherein:
said circuit means for converting the output of said first and second opto-electronic systems into electrical signals further includes a circuit for transforming said digital signal into a signal usable by the computer.

8. The substantially stationary computer screen cursor control system as defined in claim 7 wherein:
the transmission of said digital signals to said circuit for transforming said digital signals into signals usable by the computer is triggered by clock pulses.

9. The substantially stationary computer screen cursor control system as defined in claim 8 wherein:
a signal relating to the position of said first laminar spring is conveyed on a clock pulse which is 90° out of phase to the clock pulse conveying the position of said second laminar spring.

10. A method for controlling the position of a cursor on a computer screen, said method comprising the steps of:
converting the component of an applied force in an x-direction into a small mechanical deflection using a first laminar spring;
converting the component of an applied force in a y-direction into a small mechanical deflection using a second laminar spring, said y-direction being perpendicular to said x-direction;
generating a first cursor position signal from said small mechanical deflection of the first laminar spring in an x-direction using a first opto-electronic system by
emitting light in the direction of said first laminar spring,
reflecting said emitted light from said first laminar spring,
sensing said reflected light from said first laminar spring, and
producing an output representative of said sensed reflected light;
generating a second cursor position signal from said small mechanical deflection of the second laminar spring in a y-direction using a second opto-electronic system by
emitting light in the direction of said second laminar spring,
reflecting said emitted light from said second laminar spring,
sensing said reflected light from said second laminar spring, and
producing an output representative of said sensed reflected light; and
converting the output of said first and second opto-electronic systems into electrical signals usable by the computer to position the cursor on the computer screen.

11. The method for controlling the position of a cursor on a computer screen as defined in claim 10 wherein:
said sensing of said reflected light is done is a direction substantially orthogonal to said laminar springs.

12. The method for controlling the position of a cursor on a computer screen as defined in claim 11 wherein:
the axis for emitting of light is oriented at an angle of substantially 30° to the axis for sensing of reflected light.

13. The method for controlling the position of a cursor on a computer screen as defined in claim 12 wherein:
said step of converting the output of said first and second opto-electronic systems into electrical signals usable by the computer to position the cursor on a computer screen further includes comparing the output of said first and second opto-electronic systems to a reference signal.

14. The method for controlling the position of a cursor on a computer screen as defined in claim 13 wherein:
said step of comparing the output of said first and second opto-electronic systems to a reference signal, further includes the step of generating a voltage representative of the small mechanical deflection of said laminar springs.

15. The method for controlling the position of a cursor on a computer screen as defined in claim 14 wherein:
said step of converting the output of said first and second opto-electronic systems into electrical signals further includes the step of transforming the voltage representative of the small mechanical deflection of said laminar springs into a digital signal.

16. The method for controlling the position of a cursor on a computer screen as defined in claim 15 wherein:
said step of transforming the voltage representative of the small mechanical deflection of said laminar springs into a digital signal further includes transforming said digital signal into a signal usable by the computer.

17. The method for controlling the position of a cursor on a computer screen as defined in claim 16 wherein:
the transmission of said digital signal to the computer is triggered by clock pulses.

18. The method for controlling the position of a cursor on a computer screen as defined in claim 17 wherein:
the transmission of said signal relating to the component of the applied force in the x-direction is triggered by a clock pulse which is 90° out of phase with the clock pulse which triggers the transmission of the signal relating to the component of the applied force in the y-direction.

19. A substantially stationary computer screen cursor control system comprising:
a first spring that deflects in response to a force applied in an x-direction;
a second spring that deflects in response to a force applied in a y-direction, the y-direction being generally perpendicular to the x-direction;
a first opto-electronic system that illuminates the first spring, detects the deflection of the first spring, and generates an output representative of the deflection;
a second opto-electronic system that illuminates the second spring, detects the deflection of the second spring, and generates an output representative of the deflection; and
an electronic circuit that converts the output of both of the first and second opto-electronic systems into electrical signals usable by the computer to display the position of the cursor on the computer screen.

20. The substantially stationary computer screen cursor control system as defined in claim 19 wherein:

the first and second springs are laminar springs.

21. The substantially stationary computer screen cursor control system as defined in claim 20 wherein:

the first and second opto-electronic systems include a light emitting diode and a light receptor, the light emitting diode and the light receptor being constructed and arranged to cause the light emitted by the light emitting diode to be reflected by the laminar springs into the light receptor so that the light receptor provides an electrical signal representative of the received light.

22. The substantially stationary computer screen cursor control system as defined in claim 21 wherein:

the light receptor is positioned substantially orthogonally to the laminar springs.

23. The substantially stationary computer screen cursor control system as defined in claim 22 wherein:

the electrical output of the light receptor is established by the angular position of the light emitting diode with respect to the light receptor.

24. The substantially stationary computer screen cursor control system as defined in claim 23 wherein:

the electronic circuit includes a comparison circuit.

25. The substantially stationary computer screen cursor control system as defined in claim 24 wherein:

the comparison circuit generates an electrical signal determined by the distance between one of the light receptors and one of the laminar springs.

26. The substantially stationary computer screen cursor control system as defined in claim 25 wherein:

the electronic circuit includes a circuit for transforming the output of the comparison circuit into a digital signal.

27. The substantially stationary computer screen cursor control system as defined in claim 26 wherein:

the electronic circuit includes a circuit for transforming the digital signal into a signal usable by the computer.

28. The substantially stationary computer screen cursor control system as defined in claim 27 wherein:

the transmission of the digital signals to the circuit for transforming the digital signals into signals usable by the computer is triggered by clock pulses.

29. The substantially stationary computer screen cursor control system as defined in claim 28 wherein:

a signal relating to the position of the first laminar spring is conveyed on a clock pulse which is 90° out of phase to the clock pulse conveying the position of the second laminar spring.

30. A method for controlling the position of a cursor on a computer screen, the method comprising the steps of:

converting a component of an applied force in an x-direction into a deflection of a first spring;

converting a component of an applied force in a y-direction into a deflection of a second spring, the y-direction being perpendicular to the x-direction;

generating a first cursor position signal from the deflection of the first spring in an x-direction using a first opto-electronic system to illuminate the first spring;

generating a second cursor position signal from the deflection of the second spring in a y-direction using a second opto-electronic system to illuminate the second spring;

converting the output of the first and second opto-electronic systems into electrical signals usable by the computer to position the cursor on the computer screen.

31. The method for controlling the position of a cursor on a computer screen as defined in claim 30 wherein:

the first and second springs are laminar springs.

32. The method for controlling the position of a cursor on a computer screen as defined in claim 31 wherein:

the step of generating first and second cursor position signals using first and second opto-electronic systems further includes the steps of:

emitting light in the direction of the laminar springs;

reflecting the emitted light from the laminar springs;

sensing the reflected light;

producing an electrical signal representative of the sensed reflected light.

33. The method for controlling the position of a cursor on a computer screen as defined in claim 32 wherein:

the sensing of the reflected light is done is a direction substantially orthogonal to the laminar springs.

34. The method for controlling the position of a cursor on a computer screen as defined in claim 33 wherein:

the axis for emitting of light is oriented at an angle of substantially 30° to the axis for sensing of reflected light.

35. The method for controlling the position of a cursor on a computer screen as defined in claim 34 wherein:

the step of converting the output of the first and second opto-electronic systems into electrical signals usable by the computer to position the cursor on a computer screen further includes comparing the output of the first and second opto-electronic systems to a reference signal.

36. The method for controlling the position of a cursor on a computer screen as defined in claim 35 wherein:

the step of comparing the output of the first and second opto-electronic systems to a reference signal, further includes the step of generating a voltage representative of the deflection of the laminar springs.

37. The method for controlling the position of a cursor on a computer screen as defined in claim 36 wherein:

the step of converting the output of the first and second opto-electronic systems into electrical signals further includes the step of transforming the voltage representative of the deflection of the laminar springs into a digital signal.

38. The method for controlling the position of a cursor on a computer screen as defined in claim 37 wherein:

the step of transforming the voltage representative of the deflection of the laminar springs into a digital signal further includes transforming the digital signal into a signal usable by the computer.

39. The method for controlling the position of a cursor on a computer screen as defined in claim 38 wherein:

the transmission of the digital signal to the computer is triggered by clock pulses.

40. The method for controlling the position of a cursor on a computer screen as defined in claim 39 wherein:

the transmission of the signal relating to the component of the applied force in the x-direction is triggered by a clock pulse which is 90° out of phase with the clock pulse which triggers the transmission of the signal relating to the component of the applied force in the y-direction.

* * * * *